United States Patent
Powers, III

(10) Patent No.: US 11,649,986 B2
(45) Date of Patent: May 16, 2023

(54) PURLIN CONSTRUCTION AND CLIP FOR FLAT PANEL ROOF STRUCTURES

(71) Applicant: John Powers, III, Phoenix, AZ (US)

(72) Inventor: John Powers, III, Phoenix, AZ (US)

(*) Notice: Subject to any disclaimer, the term of this patent is extended or adjusted under 35 U.S.C. 154(b) by 0 days.

(21) Appl. No.: 17/168,456

(22) Filed: Feb. 5, 2021

(65) Prior Publication Data

US 2021/0239365 A1 Aug. 5, 2021

Related U.S. Application Data

(60) Provisional application No. 62/970,514, filed on Feb. 5, 2020.

(51) Int. Cl.
| | | |
|---|---|---|
| *F24S 25/634* | (2018.01) | |
| *H02S 30/10* | (2014.01) | |
| *H02S 20/24* | (2014.01) | |
| *F24S 25/15* | (2018.01) | |
| *F24S 25/13* | (2018.01) | |
| *F24S 25/33* | (2018.01) | |
| *H02S 30/00* | (2014.01) | |
| *F24S 25/12* | (2018.01) | |
| *F24S 25/35* | (2018.01) | |
| *F24S 25/60* | (2018.01) | |

(52) U.S. Cl.
CPC ............ *F24S 25/634* (2018.05); *F24S 25/12* (2018.05); *F24S 25/13* (2018.05); *F24S 25/15* (2018.05); *F24S 25/33* (2018.05); *F24S 25/35* (2018.05); *H02S 20/24* (2014.12); *H02S 30/00* (2013.01); *H02S 30/10* (2014.12); *F24S 2025/6003* (2018.05); *Y02E 10/47* (2013.01)

(58) Field of Classification Search
CPC .......... F24S 25/634; F24S 25/12; F24S 25/13; F24S 25/15; F24S 25/33; F24S 25/35; F24S 2025/6003; H02S 20/24; H02S 30/00; H02S 30/10; Y02E 10/47
See application file for complete search history.

(56) References Cited

U.S. PATENT DOCUMENTS

| | | | | |
|---|---|---|---|---|
| 4,870,798 A | * | 10/1989 | Richter | .................. E04D 3/364 |
| | | | | 52/537 |
| 6,354,045 B1 | * | 3/2002 | Boone | .................. E04D 3/3608 |
| | | | | 52/95 |
| 9,512,617 B2 | * | 12/2016 | Powers, III | ......... E04D 13/1612 |
| | | (Continued) | | |

FOREIGN PATENT DOCUMENTS

| | | | | |
|---|---|---|---|---|
| CA | 2334538 C | * | 7/2005 | .......... E04D 3/3608 |
| CN | 110518867 A | * | 11/2019 | |
| | (Continued) | | | |

*Primary Examiner* — Jessie T Fonseca
(74) *Attorney, Agent, or Firm* — Parsons & Goltry; Robert Parsons; Michael Goltry

(57) ABSTRACT

Solar panels are coupled to elongated purlins by solar panel clamps. A single strip of sheet metal is folded to form a first mounting portion, a second mounting portion opposed to the first mounting portion, and a first section of an upright wall extending perpendicularly therebetween. A first and second mounting shelves extend perpendicularly from the first section of the upright wall. A second section of the upright wall extends perpendicularly from between the first and second mounting shelves. A plurality of solar panel clamps affix the plurality of solar panels to the mounting shelves of the elongated purlins.

11 Claims, 4 Drawing Sheets

(56) References Cited

U.S. PATENT DOCUMENTS

| | | | | |
|---|---|---|---|---|
| 2014/0318046 A1* | 10/2014 | Powers, III | ............... | E04C 3/02 |
| | | | | 52/173.3 |
| 2016/0108617 A1* | 4/2016 | Powers, III | ............. | F24S 25/12 |
| | | | | 29/897.3 |
| 2016/0282018 A1* | 9/2016 | Ash | ....................... | F24S 25/636 |
| 2021/0399680 A1* | 12/2021 | Crook | ..................... | H02S 30/10 |

FOREIGN PATENT DOCUMENTS

| | | | | |
|---|---|---|---|---|
| CN | 210772833 U | * | 6/2020 | |
| CN | 213402889 U | * | 6/2021 | |

* cited by examiner

PURLIN CONSTRUCTION AND CLIP FOR FLAT PANEL ROOF STRUCTURES

CROSS-REFERENCE TO RELATED APPLICATIONS

This application claims the benefit of U.S. Provisional Patent Application No. 62/970,514, filed 5 Feb. 2021.

FIELD OF THE INVENTION

This invention generally relates to purlin type supports for roof structures. The invention further relates to solar panels or roof sections mounted on or forming the roof.

BACKGROUND OF THE INVENTION

At the present time, metal flat roof structures and/or solar panel mounts include purlins in a generally C-shape or, in some instances, a box-shape for extra strength. The solar panels are then mounted on the purlins by means of bolts, screws, or other fastening devices. The purlins have an upper flat surface to which the solar panels are attached. The problem that arises is that the process of attaching the solar panels to the upper flat surface of the purlins is exceptionally difficult and time consuming.

For example, the solar panels or other roof sections must be placed on the upper flat surface of the purlins which can be a difficult task for larger roof areas, and then attached to the purlins by some attachment devices. The attachment devices can, primarily, be only inserted through the purlins and into the roof sections from the bottom or beneath the roof. This can be a daunting task since the roof sections are loose and held in place only by their weight. Thus, during the step of fixing the roof sections to the purlins the roof sections can become misaligned or incompletely attached. That is some bolts, screws, or other attachment devices can be inadvertently inserted through the solar panel proper or roof section proper rather than through supporting structures surrounding the solar panels or roof sections. Also, even if the assembly is error free, the task is very work intensive with the time and effort increasing as the errors are eliminated or attempted to be eliminated.

It would be highly advantageous, therefore, to remedy the foregoing and other deficiencies inherent in the prior art.

Accordingly, it is an object of the present invention to provide a new and improved clamp for attaching solar panels to a flat roof structure.

It is another object of the present invention to provide a new and improved clamp that is simple to manufacture and easy to use in the field.

It would be highly advantageous, therefore, to remedy the foregoing and other deficiencies inherent in the prior art.

SUMMARY OF THE INVENTION

Briefly, to achieve the desired objects and advantages of the instant invention provided are Solar panels coupled to elongated purlins by solar panel clamps. A single strip of sheet metal is folded to form a first mounting portion, a second mounting portion opposed to the first mounting portion, and a first section of an upright wall extending perpendicularly from between the first mounting portion and the second mounting portion. A first mounting shelf extends perpendicularly from the first section of the upright wall parallel to and in an overlying position with the first mounting portion. A second mounting shelf extends perpendicularly from the first section of the upright wall opposing the first mounting shelf and parallel to and in an overlying position with the second mounting portion. A second section of the upright wall extends perpendicularly from between the first mounting shelf and the second mounting shelf. A plurality of solar panels, each solar panel including a generally rectangular frame with an inwardly extending horizontal leg supporting solar sensors, are carried by one of the first mounting shelf and the second mounting shelf. A plurality of solar panel clamps affixes the plurality of solar panels to the mounting shelves of the elongated purlins.

Each of the solar panel clamps can further include an attachment plate fastened to the upright wall of one of the plurality of purlins with the attachment plate including a surface for engagement with the purlin and an edge generally perpendicular thereto and a U-shaped element having a closed end and an open end, coupled to the attachment plate. The open end receives one of the first mounting shelf and the second mounting shelf therein along with an inwardly extending horizontal leg of the frame of one of the plurality of solar panels.

The U-shaped element includes a first portion and a second portion joined at the closed end and terminating at a first edge and a second edge, respectively. The first edge of the first portion of the U-shaped member forms a juncture with the edge of the attachment plate with the first portion perpendicular to the surface of the attachment plate.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
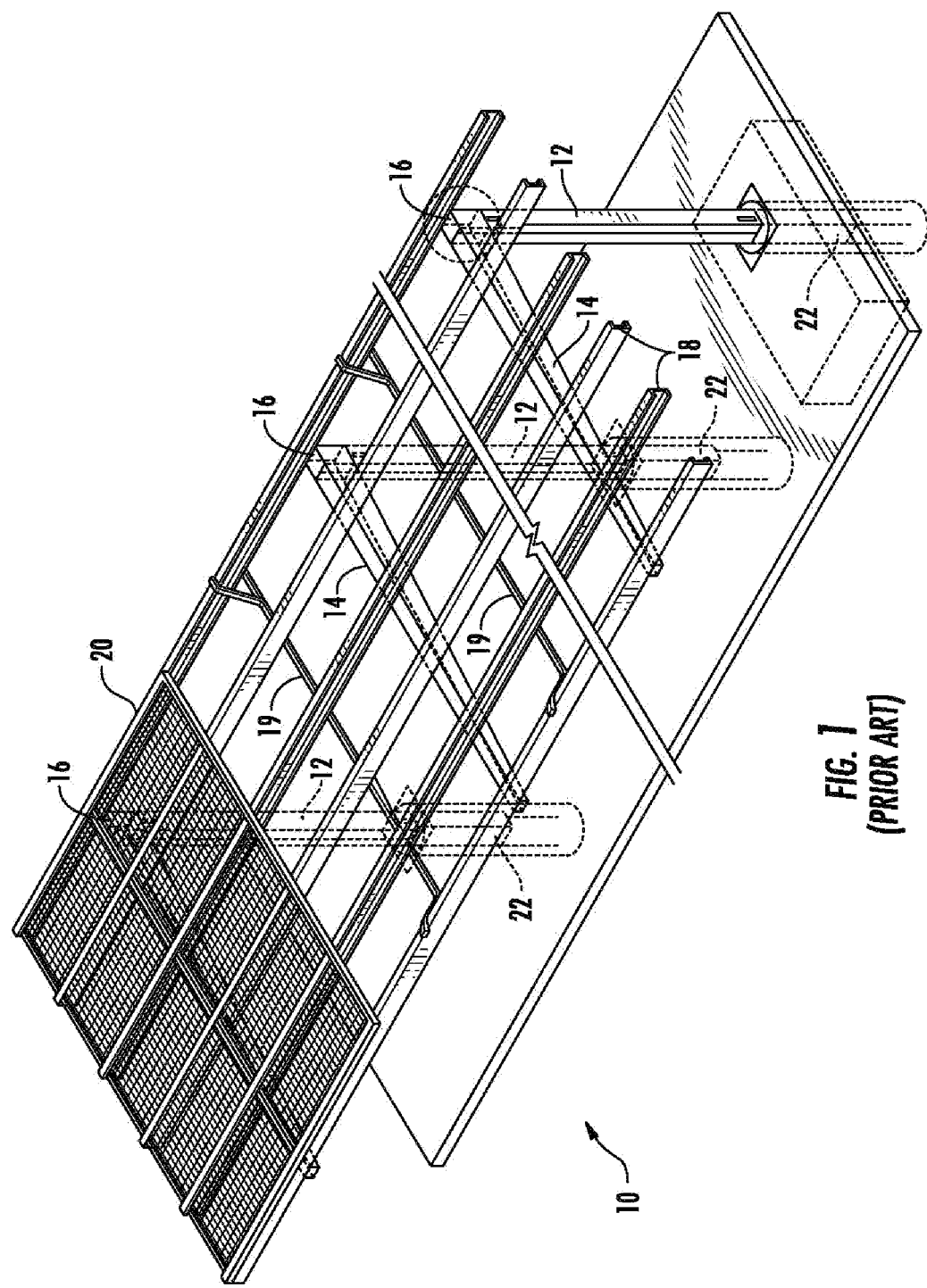
FIG. 1 is an isometric top view of a flat, cantilevered multi-column roof structure of a type anticipated for the present invention.

Turning now to FIG. 1, a flat, cantilevered multi-column structure 10 is illustrated. Structure 10 includes a plurality of vertical columns or posts 12 each with a cantilever beam 14 attached to an upper end 16. While cantilevered beams are illustrated in this example, it will be understood that the present invention can be used with virtually any type of beams upon which purlins are, or can be attached. A plurality of purlins 18 are affixed to upper surfaces of beams 14 and positioned to extend longitudinally in parallel spaced apart relationship to substantially define the roof area. In this specific example, C-shaped purlins are illustrated for simplicity but it will be understood that purlins 18 represent the purlins to be described below. Additional purlin braces 19 can be incorporated between cantilever beams 14 for additional support if desired or deemed necessary. Roofing material, such as solar panels or flat roof sections 20 are attached to the upper surface of purlins 18 to form a complete roof. It will be understood that structure 10 is used simply as an example of a flat roof structure and many alterations and changes may be incorporated for specific applications.

For purposes of this disclosure it should be understood that structure 10 is chiefly assembled at the site and it is highly desirable that each step of the assembly procedure be as simple as possible. Basically, each of the components mentioned above (i.e. column 12, beams 14, purlins 18, and roof sections 20) are provided as individual items from a factory/shop and assembled on site into structure 10. By providing the items separately each item can be relatively easily handled by workmen conveying the items to the site and by workmen doing the assembling at the site. Briefly, the assembly procedure includes fixing a lower end 22 of each column 12 in the ground or in a base that serves as the ground. One end of a cantilever beam 14 is affixed to the upper end 16 of each column 12, or if a conventional beam 14 is used, each end is affixed to a column 12.

With beams 14 fixedly attached, purlins 18 are attached to the upper surface of beams 14 in a direction perpendicular to beam 14. Further, as can be seen from FIG. 1, purlins 18 are spaced apart a distance sufficient to allow roof sections 20 to be placed therebetween with opposed edges of roof sections 20 supported by adjacent purlins 18.

Figure 2:
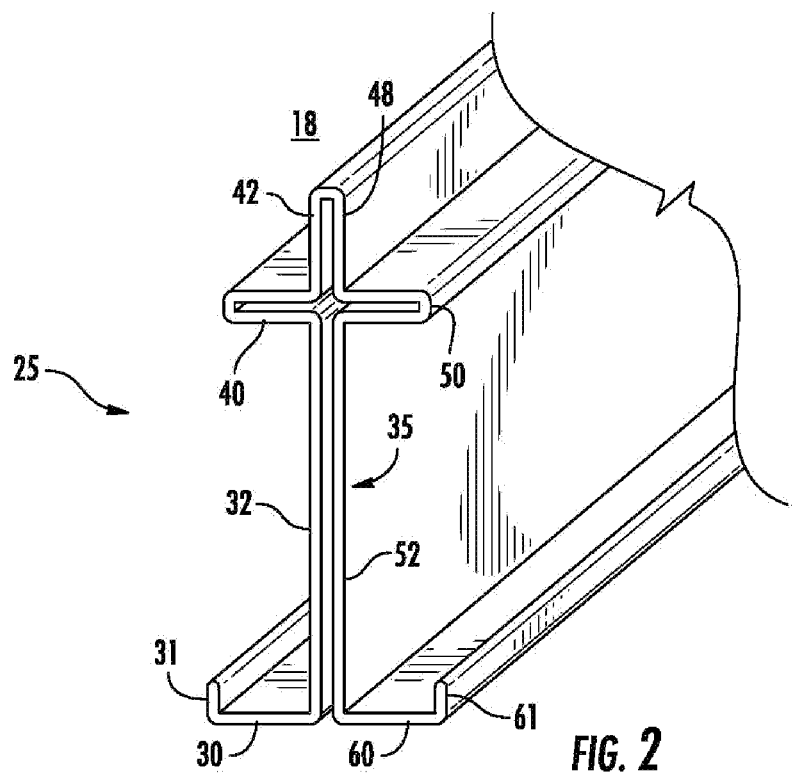
FIG. 2 is a partial longitudinal perspective view of the improved purlin in accordance with the present invention.
Figure 3:
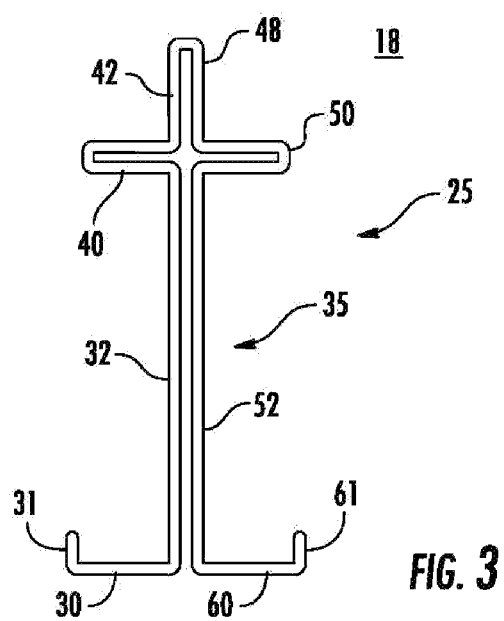
FIG. 3 is a partial end view of an improved purlin used in the structure of FIG. 1 illustrated in FIG. 2.

Referring specifically to FIGS. 2 and 3, purlin 18 is formed from a single strip of sheet metal (designated 25) bent into the formation illustrated. A single strip of sheet metal is used for simplicity and strength. Strip 25 is preferably 0.040 inches thick steel sheet. During the folding process strip 25 is doubled in thickness to provide walls 0.080 inches thick. Purlin 18 includes a first flat horizontal mounting portion 30 with an upwardly directed lip 31 formed at an outer edge. Strip 25 is bent upwardly from an edge of portion 30 opposite lip 31 into a first section 32 of an upright wall generally designated 35. At the upper end of section 32, strip 25 is bent outwardly parallel to and in an overlying position with mounting portion 30 to define and position a first purlin mounting shelf 40. Strip 25 is bent back upon itself (approximately 360 degrees) and then bent upward again (approximately 90 degrees) parallel and in a plane with section 32, to complete first purlin mounting shelf 40. Strip 25 continues upwardly in a section 42, which extends a distance substantially the thickness of a roof section 20.

At an upper end of section 42, strip 25 is bent back upon itself by being turned back down (approximately 360 degrees) parallel to and in abutting engagement with section 42 to form a section 48 with a length equal to section 42. Sections 42 and 48 form an upright portion and may be considered as a second section of upright wall 35. At the lower end of section 48, strip 25 is bent outwardly parallel to and in an opposed direction with first purlin mounting shelf 40 to define and position a second purlin mounting shelf 50. Strip 25 is bent back upon itself (substantially 360 degrees) and then bent downward again parallel and in abutting engagement with section 32, to complete second purlin mounting shelf 50. Strip 25 continues downwardly in a section 52, which extends a distance equal to the length of section 32 and is in parallel abutting engagement with section 32 to complete the first section of upright wall 35.

Purlin 18 includes a second flat horizontal mounting portion 60 formed by bending strip 25 outwardly from the lower end of section 52 in a direction opposed to and in a plane with first flat horizontal mounting portion 30 and with approximately an equal width. Finally, strip 25 it bent upwardly to form an upwardly directed lip 61 at an outer edge of flat horizontal mounting portion 60. Portions 30 and 60 cooperate to form a flat mounting wall for mounting purlin 18 on a series of spaced apart roof beams as illustrated in FIG. 1. Lips 31 and 61 provide rigidity and strength to flat horizontal mounting portions 30 and 60.

It will be understood that strip 25 of sheet metal has a length equal to the desired length of purlin 18 and all of the bends, sections, etc. described above extend for the entire length of the purlin. In the preferred embodiment purlin 18 is manufactured from any convenient metal such as aluminum, sheet steel, etc. Generally, purlin 18 can be fabricated from any convenient metal material, such as a relatively heavy gauge sheet metal (e.g. 16 gauge to 25 gauge) with the specific metal (e.g. aluminum, sheet steel, etc.) selected for any specific roof application. Further, since purlin 18 is preferably formed as a single integral unit for the entire length, at least one method of manufacture, other than bending by using roll forming devices and the like, includes extruding in a well-known operation.

Figure 4:
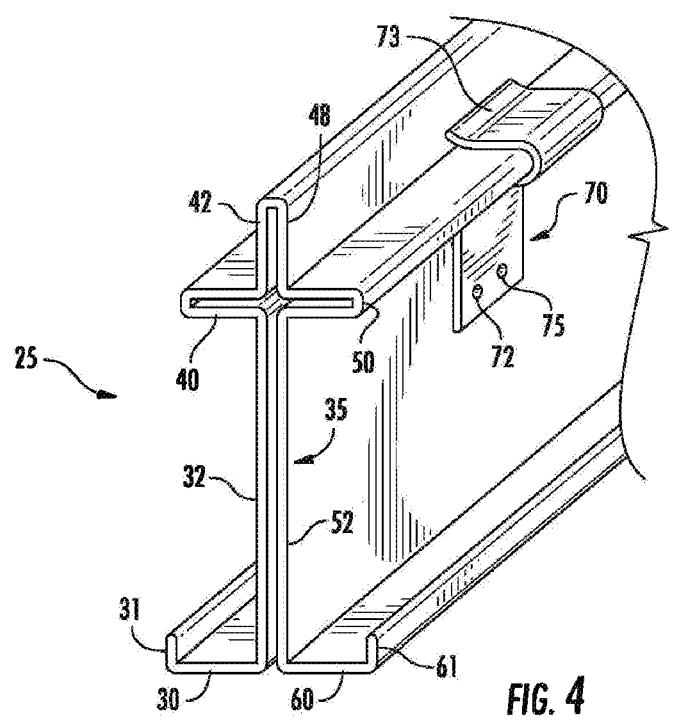
FIG. 4 is a partial longitudinal perspective view of the improved purlin illustrated in FIG. 2 showing attachment of a clip thereto, in accordance with the present invention.
Figure 5:
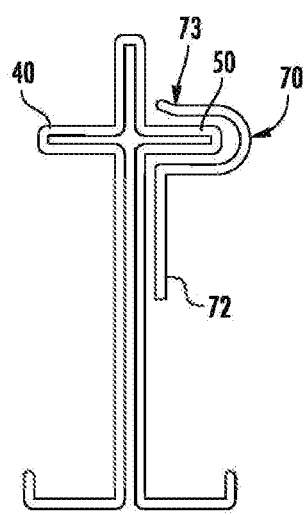
FIG. 5 is an end view of the improved purlin of FIG. 4 showing attachment of a clip thereto.
Figure 7:
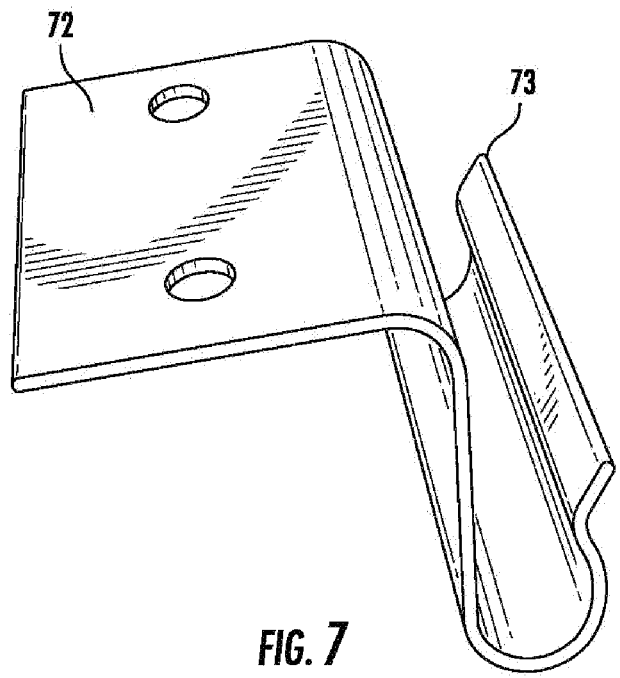
FIG. 7 is a perspective view of a clip according to the present invention.

Referring now to FIGS. 4 and 5, a clip 70 is illustrated coupled to purlin 18. With additional reference to FIG. 7, clip 70 includes an attachment plate 72 and a U-shaped element 73 extending perpendicularly from an edge of plate 72. U-shaped element 73 is shown received over second purlin mounting shelf 50. Screws or other fastener members extend through apertures 75, formed through attachment plate 72, affixing attachment plate 72 to purlin 18. U-shaped element 73 has a closed end and an open end. It is the open end that receives a mounting shelf along with the inwardly extending horizontal leg of the frame of one of the plurality of solar panels as will be described presently. U-shaped element 73 includes a first portion and a second portion joined at the closed end and terminating at a first edge and a second edge, respectively. The first edge of the first portion of the U-shaped member forms a juncture with the edge of the attachment plate with the first portion perpendicular to the surface of the attachment plate. The U-shaped element and the attachment plate can be formed of a single piece of material wherein the juncture of the first edge of the first portion and the edge of the plate is a bend in the single piece of material. Alternatively, the juncture cam be a fastening or weld.

Figure 6:
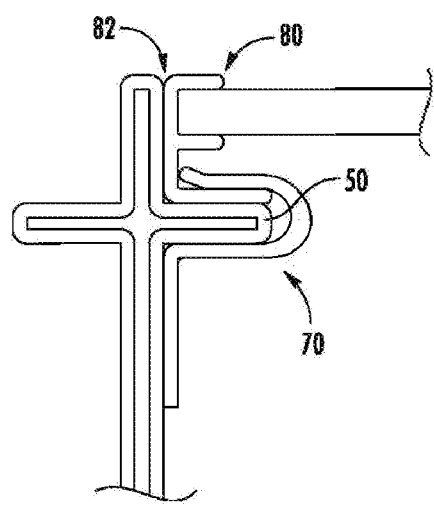
FIG. 6 is an enlarged partial end perspective view illustrating attachment of a roof panel to the purlin using the clip.
Figure 8:
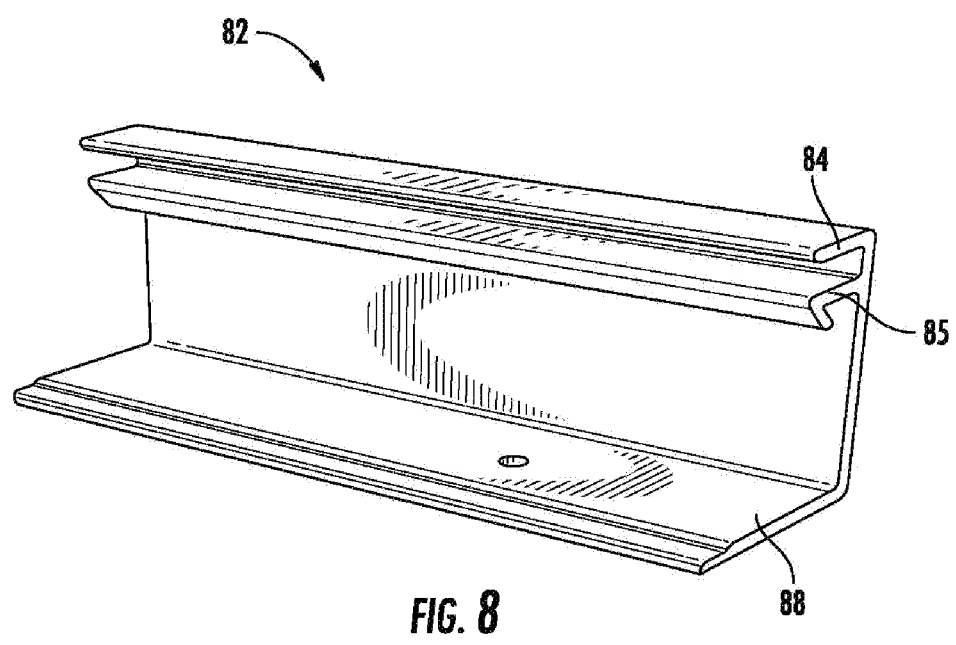
FIG. 8 is a partial perspective view of the frame of a solar panel.

Turning to FIG. 6, and edge of a solar panel 80 is illustrated resting on second purlin mounting shelf 50. It will be understood that solar panel 80 extends to an adjacent purlin wherein the opposing edge rests on first purlin mounting shelf 40 of the adjacent purlin. With additional reference to FIG. 8, a section 82 of a solar panel frame is illustrated with the solar sensors removed to provide a better view of the frame construction. As will be understood by those skilled in the art, section 82 is a portion of a rectangular frame extending completely around the periphery of the solar panel and solar sensors (not shown for convenience) are supported between horizontal ledges 84 and 85. To better understand a preferred size relationship between a solar panel and a purlin, section 82 of a solar panel is illustrated in position on second purlin mounting shelf 50 in FIG. 6. Section 82 illustrates that the solar panels discussed herein have a surrounding frame with a generally L-shaped cross-section with a horizontal leg 88 beneath horizontal ledges 84 and 85. Further, the upper end of the vertical arm of the L-shaped cross-section has a channel formed thereon between horizontal ledges 84 and 85 to surround and fixedly engage the outer edges of the solar sensors and hold them rigidly in a horizontal orientation.

Still referring to FIG. 6, a solar panel, represented by section 82, is positioned on second purlin mounting shelf 50, as explained above. A clip 70 is positioned over the horizontal leg 88 of section 82 and second purlin mounting shelf 50. Since the solar panel is open from the bottom, clip 70 can be conveniently positioned as shown with the roof completely assembled. Clip 70 is positioned with attachment plate 72 extending vertically downwardly parallel to upright wall 35 of purlin 18. Fasteners extending through attachment plate 72 and into upright wall 35 fix clip 70, and thus, section 82 in position. While a single clip 70 is illustrated in this example it will be understood that as many clamps as needed can be used on a single solar panel or roof section.

In this preferred embodiment an elongated strip of sheet metal is formed into a purlin by bending it multiple times along the longitudinal axis. While the bends are described herein in a specific order for convenience in understanding, it will be understood that the various bends might be performed in any convenient order. Thus, it will be understood that the new and improved purlins for use in flat roof structures are easily positioned and mounted. The new and improved purlins for use in flat roof structures are manufactured from any convenient metal such as aluminum, sheet steel, etc. Also, the new and improved purlins for use in flat roof structures can be easily bolted to roof beams at the site and do not require any on-site welding or any special tools. Further, the new and improved purlins for flat roof structures and the positioning and mounting devices are relatively simple and inexpensive to manufacture and install.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A plurality of solar panels coupled to elongated purlins by a plurality of solar panel clamps, comprising:
   each elongated purlin formed from a single strip of sheet metal folded to comprise:
   a first mounting portion;
   a second mounting portion opposed to the first mounting portion;
   a first section of an upright wall extending perpendicularly from between the first mounting portion and the second mounting portion;
   a first mounting shelf extending perpendicularly from the first section of the upright wall parallel to and in an overlying position with the first mounting portion;
   a second mounting shelf extending perpendicularly from the first section of the upright wall opposing the first mounting shelf and parallel to and in an overlying position with the second mounting portion; and
   a second section of the upright wall extending perpendicularly from between the first mounting shelf and the second mounting shelf;
   each solar panel including a generally rectangular frame with an inwardly extending horizontal leg supporting solar sensors, each of the plurality of solar panels carried by one of the first mounting shelf and the second mounting shelf; and
   the plurality of solar panel clamps affixing the plurality of solar panels to the first mounting shelves and the second mounting shelves of the elongated purlins.

2. A plurality of solar panels coupled to elongated purlins by a plurality of solar panel clamps as claimed in claim 1 wherein each of the solar panel clamps further comprising:
   an attachment plate fastened to the first section of the upright wall of one of the plurality of purlins, the attachment plate including a surface for engagement with the respective purlin and an edge generally perpendicular thereto;
   a U-shaped element having a closed end and an open end, coupled to the attachment plate; and
   wherein the open end receives one of the first mounting shelf and the second mounting shelf therein along with the inwardly extending horizontal leg of the frame of one of the plurality of solar panels.

3. A plurality of solar panels coupled to elongated purlins by a plurality of solar panel clamps as claimed in claim 2 wherein the U-shaped element includes a first portion and a second portion joined at the closed end and terminating at a first edge and a second edge, respectively, and wherein the first edge of the first portion of the U-shaped member forms a juncture with the edge of the attachment plate with the first portion perpendicular to the surface of the attachment plate.

4. A plurality of solar panels coupled to elongated purlins by a plurality of solar panel clamps as claimed in claim 3 wherein the U-shaped element and the attachment plate are formed of a single piece of material and wherein the juncture of the first edge of the first portion and the edge of the attachment plate is a bend in the single piece of material.

5. A plurality of solar panels coupled to elongated purlins by a plurality of solar panel clamps as claimed in claim 3 wherein the juncture of the first edge of the first portion and the edge of the attachment plate is a weld.

6. Solar panels coupled to elongated purlins by solar panel clamps comprising:
   the elongated purlins incorporated into a roof structure, each purlin including a single strip of sheet metal folded to comprise:
   a first mounting portion having an inner edge;
   a first portion of an upright wall extending perpendicularly from the inner edge of the first mounting portion;
   a first mounting shelf includes a first portion extending perpendicularly from the first portion of the upright wall parallel to and in an overlying position with the first mounting portion and a second portion of the first mounting shelf bent back overlying the first portion of the first mounting shelf;
   an upper upright portion includes a first portion extending from and perpendicular to the second portion of the first mounting shelf and a second portion of the upper upright portion bent back overlying the first portion of the upper upright portion;
   a second mounting shelf includes a first portion extending perpendicularly from the second portion of the upper upright portion diametrically opposed to the first mounting shelf and a second portion bent back underlying the first portion of the second mounting shelf;

a second portion of the upright wall extending perpendicularly from the second portion of the second mounting shelf a distance equal to the length of the first portion of the upright wall in parallel abutting engagement therewith; and a second mounting portion extending perpendicularly from the second portion of the upright in a direction opposed to and in a plane with the first mounting portion;

each solar panel including a generally rectangular frame with an inwardly extending horizontal leg supporting solar sensors, each of the solar panels carried by one of the first mounting shelf and the second mounting shelf; and solar panel clamps affixing solar panels to the mounting shelves of the elongated purlins.

7. Solar panels coupled to elongated purlins by solar panel clamps as claimed in claim 6 wherein each of the solar panel clamps further comprising:

an attachment plate fastened to the upright wall of one of the plurality of purlins, the attachment plate including a surface for engagement with the respective purlin and an edge generally perpendicular thereto;

a U-shaped element having a closed end and an open end, coupled to the attachment plate; and wherein the open end receives one of the first mounting shelf and the second mounting shelf therein along with a portion of the frame of one of the plurality of solar panels.

8. Solar panels coupled to elongated purlins by solar panel clamps as claimed in claim 7 wherein the U-shaped element includes a first portion and a second portion joined at the closed end and terminating at a first edge and a second edge, respectively, and wherein the first edge of the first portion of the U-shaped member forms a juncture with the edge of the attachment plate with the first portion perpendicular to the surface of the attachment plate.

9. Solar panels coupled to elongated purlins by solar panel clamps as claimed in claim 8 wherein the U-shaped element and the attachment plate are formed of a single piece of material and wherein the juncture of the first edge of the first portion and the edge of the attachment plate is a bend in the single piece of material.

10. Solar panels coupled to elongated purlins by solar panel clamps as claimed in claim wherein the juncture of the first edge of the first portion and the edge of the attachment plate is a weld.

11. Solar panels coupled to elongated purlins by solar panel clamps as claimed in claim 6 further comprising:

a first lip formed perpendicularly at an outer edge of the first mounting portion and parallel to and opposite the first portion of the upright wall; and a second lip formed perpendicularly at an outer edge of the second mounting portion and parallel to and opposite the second portion of the upright wall.

\* \* \* \* \*